July 3, 1962 G. GABRIEL 3,041,905
COOLING, LUBRICATING, AND CHIP REMOVING
SYSTEM FOR NIBBLING MACHINES
Filed July 23, 1958
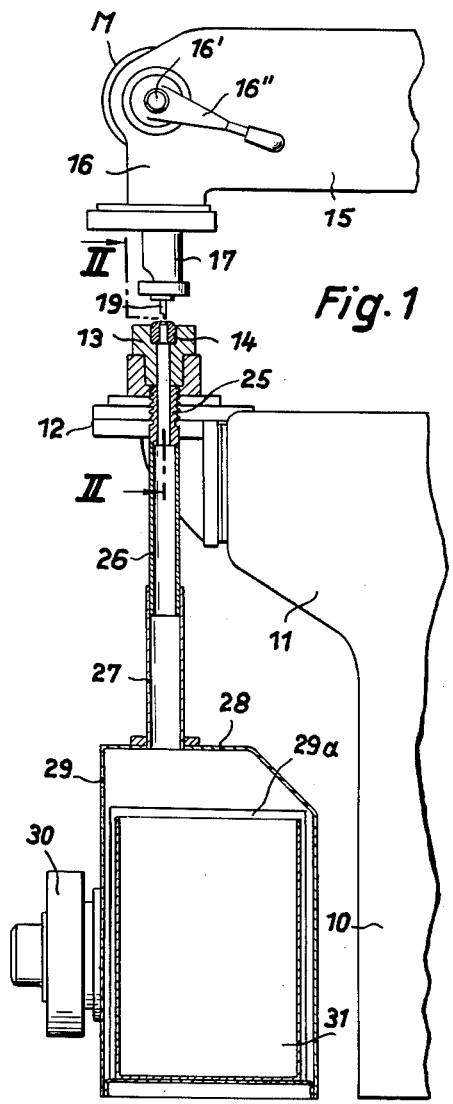
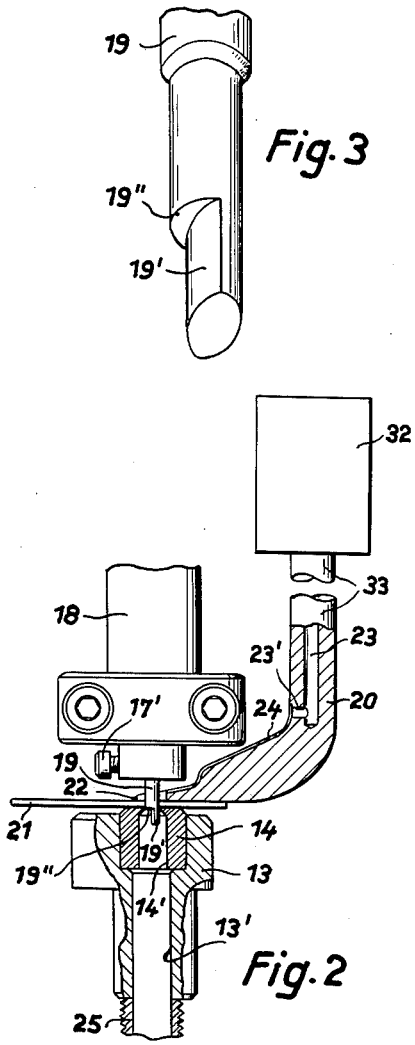
INVENTOR.
Gerhard Gabriel
BY Michael S. Striker
Attorney though that portion of the reciprocable male shearing member which is diametrically opposed to its cutting edge exerts relatively high pressure against the adjacent wall portion surrounding the bore in the female shearing member and generates a considerable friction at that point. Friction between the shearing members often increases their temperature to the blue-hot point.

United States Patent Office 3,041,905
Patented July 3, 1962

3,041,905
COOLING, LUBRICATING, AND CHIP REMOVING SYSTEM FOR NIBBLING MACHINES
Gerhard Gabriel, Waiblingen, Germany, assignor to Trumpf & Co., Stuttgart-Weilimdorf, Germany
Filed July 23, 1958, Ser. No. 750,452
Claims priority, application Germany July 31, 1957
7 Claims. (Cl. 83—100)

The present invention relates to stamping machines of the type known as nibbling machines, and more particularly to improvements in cooling, lubricating and chip-removing systems in such apparatus.

Nibbling machines comprise a hollow female shearing member or matrix and a reciprocable male shearing member which latter cuts punchings or chips out of a plastic or metallic work sheet placed above the female shearing member. The chips, which drop through the bore in the female shearing member, are customarily of half-moon or crescent shape. The reciprocable shearing member is of circular cross sectional contour save for its lower end portion entering into the bore in the female shearing member which is reduced by removing therefrom a crescent-shaped layer of material in axially parallel direction. The so-formed crescent-shaped shoulder has a substantially semi-circular contour line which constitutes the cutting or shearing edge of the reciprocable shearing member. A complementary cutting or shearing edge is provided at the upper end of bore in the female shearing member.

In operation, the cutting edge of the male shearing member, by abutting and pressing against the work sheet, generates a component of shearing force at right angles to the axis of said shearing member. This force component tends to move male shearing member in a direction away from the work sheet whereby that portion of the reciprocable male shearing member which is diametrically opposed to its cutting edge exerts relatively high pressure against the adjacent wall portion surrounding the bore in the female shearing member and generates a considerable friction at that point. Friction between the shearing members often increases their temperature to the blue-hot point.

Attempts were made to reduce such friction between the shearing members in nibbling machines by supplying a cooling fluid, e.g., oil, thereto. The cooling fluid is customarily led through or along the retaining means for a work sheet, also called the jack or the pressing finger, the latter comprising channels which communicate with a conduit for the cooling fluid and have discharge apertures or nozzles adjacent to the reciprocable shearing member. However, due to high pressures prevailing between the contacting surfaces of shearing members, and more particularly between that side of the reciprocable shearing member which faces away from its cutting edge and the adjacent wall portion in the bore of the female shearing member, the coolant is often prevented from entering into the space between such surfaces or, at best, cannot be supplied thereto to an extent necessary to satisfactorily cool and lubricate all frictionally engaging surfaces of both shearing members and the area surrounding the cutting edge of the reciprocable shearing member. Therefore, such conventional cooling systems cannot prevent overheating of shearing members which latter must be replaced after relatively short periods of use, particularly due to dullness of the cutting edges.

Attempts to avoid overheating by applying the cooling fluid with a brush or the like, too, were unsuccessful because such application of a liquid substance necessarily causes a slow-down in operation due to relatively lengthy interruptions between the successive strokes of the reciprocable shearing member and, in addition, cannot satisfactorily cool and lubricate the cutting edges and frictionally engaging surfaces of the shearing members.

A further drawback of known nibbling machines is in that the chips or punchings tend to accumulate in the bore of the female shearing member which causes frequent breakage of the one and/or the other shearing member.

In certain nibbling machines of known construction, attempts were made to overcome the twin drawback of overheating under friction and clogging of female shearing member by introducing the cooling fluid in the form of thin jets with the intent to increase the rinsing effect of such fluid. This procedure, too, has failed to bring about satisfactory results particularly because the cooling fluid spreads over the work sheet and cannot be collected for renewed use. This increases the consumption of coolant and renders the operation less economical. If a hollow reciprocable shearing member is used to permit introduction of a coolant therethrough, the operation is uneconomical for the same reasons. In addition, the use of a hollow reciprocable shearing member raises certain constructional problems mainly because the resistance of a hollow die to breakage is considerably reduced.

An important object of the present invention is to provide a stamping machine in which the cooling and lubricating system is so constructed that the consumption of fluid is extremely low.

Another object of the invention is to provide a system as above set forth which operates in such manner that the cooling fluid is automatically collected for renewed use.

An additional object of the instant invention is to provide a nibbling machine which is so constructed that the formation of fog or vapors at the point of contact between the shearing members and the work sheet is either eliminated or reduced sufficiently to permit inspection of operation by an attendant.

A further object of the invention is to provide a cooling and lubricating system for nibbling machines and similar machine tools in which the fluid is supplied in pulsating fashion to the parts subjected to greatest frictional forces.

A still further object of the invention is to provide a cooling and lubricating system for nibbling machines and like apparatus which is constructed with a view to automatically remove any chips or punchings which might tend to accumulate in the female shearing member.

A yet further object of my invention is to provide a cooling and lubricating system of the above outlined characteristics which comprises means for collecting the chips and the cooling fluid.

A concomitant object of the invention is to provide a novel cooling, lubricating and chip-removing system for nibbling machines and like machine tools which may be installed in apparatus of known construction.

The above and many other objects of the invention are attained by the provision of a suction or exhaust system connected with the female shearing member to create a subatmospheric pressure in the latter's bore which causes the entry into said bore of a suitable cooling fluid, preferably a lubricant, as well as of atmospheric air whenever the reciprocable shearing member performs its upward stroke away from the female shearing member. The suction system comprises a housing airtightly sealed from the surrounding atmosphere to permit the entry of air only through the bore in the female shearing member, and a receptacle in said housing so located to receive by gravity feed the cooling fluid and the chips or punchings removed from the work sheet during successive strokes of the reciprocable shearing member. The housing is coupled with suitable vacuum generating means, such as an exhaust fan or the like, to cause the inflow of a cooling fluid into the female shearing member, the fluid being preferably supplied from a gravity-feed apparatus over the customary hold-down device or pressing finger which latter holds the work sheet in proper position with respect to the shearing members and may also serve to advance the work sheet after each working stroke of the reciprocable shearing member.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing, in which:

FIG. 1 is a somewhat schematic, fragmentary, partly elevational and partly sectional view of the improved nibbling machine;

FIG. 2 is an enlarged partly elevational and partly sectional detail view as seen in the direction of arrows from line II—II in FIG. 1; and FIG. 3 is a perspective view of the reciprocable shearing member.

Referring now in greater detail to the drawing, the machine therein shown includes a base or frame 10 comprising a lower support or leg 11 and an upper support or leg 15. Lower support 11 carries a table or bench 12 for the matrix holder or support 13, the latter receiving a stationary hollow female shearing member of matrix 14.

Upper support or leg 15 of the machine frame carries the drive housing 16 and a guide member 17 for the vertically reciprocable ram 18. Housing 16 carries the motor M which rotates the driving shaft 16' of the ram 18, and an actuating lever 16" by means of which the working stroke and/or the vertical position of ram 18 may be controlled.

A reciprocable male shearing member 19 is connected to the lower end of ram 18. The drive housing also supports a retaining device or pressing finger 20, shown in FIG. 2, the purpose of finger 20 being to hold a work sheet 21 in position upon the stationary shearing member or matrix 14. To that end, the free lower end of finger 20 is forked, as at 22, its prongs surrounding the reciprocable shearing member 19 when the latter descends and passes through the work sheet 21 to enter into the cavity or bore 14' in the female shearing member 14. Finger 20 is formed with a bore 23 the upper end of which is connected to a conduit 33 for cooling fluid leading to a source, for example, a gravity-feed drop lubricator 32 or the like. The lower end of bore 23 communicates with at least one but preferably more channels 24 over a connecting passage 23', channels 24 leading toward the bifuracated portion 22 and hence to the reciprocable shearing member 19. In this manner, the cooling fluid is led directly to the point where the work sheet is chipped off by the descending member 19.

As illustrated in FIG. 3, reciprocable shearing member 19 is of generally circular cross-sectional contour save for its lower end portion 19' which enters into the bore 14' of, and is guided by, the matrix 14 when the member 19 descends and passes through the work sheet 21. Lower end portion 19' is formed by removing a crescent-shaped layer from the shearing member 19 to define a crescent-shaped shoulder 19" whose semi-circular contour line consitutes the cutting or shearing edge of the male shearing member. The upper end of member 19 is held in the ram 18 by means of a thumb screw 17' or the like. In FIG. 1, ram 18 is retracted into the guide member 17 to withdraw the lower end portion 19' of reciprocable shearing member 19 from the bore 14' in matrix 14. In FIG. 2, the ram is shown in the position in which it has completed its working stroke and the end portion 19' of shearing member 19 extends into the bore 14' of the female shearing member. The chip is cut out of work sheet 21 by the shearing edge of shoulder 19" and by the shearing edge of matrix 14 which surrounds the upper end of its bore 14'.

Holder 13 for the female shearing member 14 is formed with a vertical passage or bore 13' which is aligned with bore 14', passage 13' in turn forming a continuation of the bore provided in a hollow adjusting screw 25 which is received in the table 12 atop the lower leg 11 of the machine frame. The function of screw 25 is to bring about adjustments in the position of female shearing member 14 with respect to the reciprocable shearing member 19.

The lower end of hollow screw 25 is airtightly coupled with a gravity tube 26 which latter has a lower end airtightly received in a tubular member or pipe 27. Adjustments in the position of female shearing member 14 with respect to the reciprocable shearing member 19 may be made, for example, by rotating members 25, 26 whereby the external threads on screw 25, meshing with internal threads in the bore of table 12, lift the holder 13 with member 14 when turned in one direction, and permit descent of parts 13, 14 when rotated in the opposed direction.

The lower end of pipe 27 is fixed to the cover or lid 28 of a housing 29 which is sealed against the surrounding atmosphere and receives a receptacle 31 for the chips or punchings cut out of the work sheet 21 during the passage of reciprocable shearing member 19 therethrough. Housing 29 carries a vacuum generating device, e.g. a fan 30, which evacuates air from the vertical bores 14', 13', from the hollow screw 25, from telescopically connected tubular members 26, 27, and from the housing 29. A door 29a is provided in housing 29 to permit removal of receptacle 31 when the latter is filled with chips dropping through the vertical chute from work sheet 21. It is preferred to secure the fan 30 directly to a wall of housing 29 so that parts 29 and 30 constitute a unitary structure.

Air can enter housing 29 only through the bore 14' in matrix 14; thus, there is created a strong indraft of air which causes the coolant, e.g. a suitable lubricating oil, to enter the bore 14' whenever the end portion 19' of reciprocable shearing member 19 is withdrawn from said bore. The effect of coolant supplied from tank 32 is particularly felt on the inner wall of matrix 14 diametrically opposed to the shearing shoulder 19" of the male shearing member 19. Thus, the cooling and lubricating effect of fluid entering bore 14' from channels 24 in finger 20 is especially felt on such portions of shearing members 14, 19 which are subjected to greatest friction when the male shearing member reciprocates, and overheating of the dies is prevented. At the same time, the surging air entering at the upper end of bore 14' causes the chips which might remain in the matrix 14 to drop by gravity into the receptacle 31. It will be seen that, due to sub-atmospheric pressures prevailing in housing 29 and in the bore 14', cooling fluid supplied through the channels in finger 20 is particularly strongly and substantially uniformly felt on the cutting or shearing edges of both shearing members and on the outer surface of the reciprocable shearing member. In addition, the consumption of cooling lubricant is very low as the fluid may be supplied dropwise, i.e. in pulsating fashion, to the bore 23 in finger 20.

As before stated, a further advantage of the improved cooling and lubricating system is in that the inflowing air causes removal of chips from the matrix 14. In addition, any vapors developing at the points of contact between work sheet 21 and shearing members or dies 14, 19 are also withdrawn into the enclosure 29. The removal of oil vapors is desirable and necessary not only for sanitary reasons but also because such vapors might obscure an attendant's view in inspecting the operation of the nibbling machine.

The provision of means for creating vacuum in the female shearing member has the further advantage that the operation is more economical even if hard-to-cut materials, such as thick sheet metal plates are being utilized. If relatively thick sheets are worked upon in nibbling machines of known construction, the useful life of shearing members, due to wear and/or breakage, is so high as to render the operation uneconomical. Hence, the improved system not only brings about savings in operation with relatively thin work sheets but, in addition, opens new areas of use for nibbling machines and similar machine tools.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A stamping machine of the character described comprising, in combination: a frame having an upper portion and a lower portion; an elongated vertically reciprocable shearing member connected to said upper portion and a second shearing member supported by said lower portion beneath said reciprocable shearing member, said members having cooperating shearing edges adapted to cut chips out of a work sheet interposed therebetween, and said second shearing member having a vertical bore for reception of a part of said reciprocable shearing member fitting with cutting clearance in said bore when said reciprocated in a direction toward said second shearing member whereby said shearing edges cut a chip out of said work sheet and cause the chip to enter said bore, said elongated reciprocable shearing member alternatively opens and closes said bore during its reciprocation; holding means for said work sheet connected with one of said portions and having at least one channel leading toward the shearing edge of said second shearing member; a source of lubricating liquid connected with said holding means for supplying lubricating liquid into said channel; and means operatively connected with said second shearing member for creating vacuum in said bore, the machine operating in such manner that, when said reciprocable shearing member is reciprocated in a direction away from said second shearing member, said last mentioned means draws air and lubricating liquid into said bore for cooling and lubricating said second shearing member and for withdrawing the chips from said bore.

2. A stamping machine of the character described comprising, in combination: a frame having an upper portion and a lower portion; an elongated vertically reciprocable shearing member connected to said upper portion and a second shearing member supported by said lower portion beneath said reciprocable shearing member, said members having cooperating shearing edges adapted to cut chips out of a work sheet interposed therebetween, and said second shearing member having a vertical bore for reception of a part of said reciprocable shearing member fitting with cutting clearance in said bore when said reciprocable shearing member is reciprocated in a direction toward said second shearing member whereby said shearing edges cut a chip out of said work sheet and cause the chip to enter said bore, said elongated reciprocable shearing member alternatively opens and closes said bore during its reciprocation; a pressing finger for said work sheet connected with one of said portions and having a plurality of channels leading toward the shearing edge of said second shearing member; a source of lubricating liquid connected with said finger for supplying lubricating liquid into said channels; and means operatively connected with said second shearing member for creating vacuum in said bore, the machine operating in such manner that, when said reciprocable shearing member is reciprocated in a direction away from said second shearing member, said last mentioned means draws air and fluid lubricating liquid into said bore for cooling and lubricating said second shearing member and for withdrawing the chips from said bore.

3. A stamping machine of the character described comprising, in combination: a frame having an upper portion and a lower portion; an elongated vertically reciprocable shearing member connected to said upper portion and a second shearing member supported by said lower portion beneath said reciprocable shearing member, said members having cooperating shearing edges adapted to cut chips out of a work sheet interposed therebetween, and said second shearing member having a vertical bore for reception of a part of said reciprocable shearing member fitting with cutting clearance in said bore when said reciprocable shearing member is reciprocated in a direction toward said second shearing member whereby said shearing edges cut a chip out of said work sheet and cause the chip to enter said bore, said elongated reciprocable shearing member alternatively opens and closes said bore during its reciprocation; holding means for said work sheet connected with one of said portions and having at least one channel leading toward the shearing edge of said second shearing member; a source of lubricating liquid connected with said holding means for supplying lubricating liquid into said channel and means operatively connected with said second shearing member for creating vacuum in said bore and comprising tubular means disposed beneath and airtightly connected with said second shearing member, said tubular means defining a vertical passage having an upper end communicating with said bore and a lower end, an enclosure disposed beneath and airtightly connected with said tubular means in such manner that its interior communicates with the lower end of said passage, and exhaust fan means connected with said enclosure for withdrawing air from said enclosure, from said passage and from said bore; the machine operating in such manner that, when said first mentioned shearing member is reciprocated in a direction away from said second shearing member, said exhaust fan means draws air and lubricating liquid into said bore and causes the chips to drop into said enclosure.

4. A stamping machine of the character described which comprises, a combination: a frame having an upper portion and a lower portion; an elongated vertically reciprocable shearing member connected to said upper portion and a second shearing member supported by said lower portion, said members having cooperating shearing edges adapted to cut chips out of a work sheet interposed therebetween, and said second shearing member having a vertical bore for reception of a part of said first mentioned shearing member fitting with cutting clearance in said bore when said reciprocable shearing member is reciprocated in a direction toward said second shearing member whereby said shearing edges cut a chip out of said work sheet and cause the chip to enter into said bore, said elongated reciprocable shearing member alternatively opens and closes said bore during its reciprocation; a pressing finger connected to said upper portion and extending toward said second shearing member for holding said work sheet in position thereabove, said finger having a bifurcated lower end surrounding said first mentioned shearing member when the latter is reciprocated in a direction toward said second shearing member and a plurality of channels leading toward said bifurcated end; a source of lubricating liquid connected with said finger for introducing cooling lubricating liquid into said channels; tubular means disposed beneath said second shearing member, said tubular means having an upper end connected with said second shearing member, a lower end, and defining a vertical passage communicating with said bore; an enclosure connected with the lower end of said tubular means in such manner that its interior communicates with said passage; and means for creating vacuum in said enclosure, in said passage and in said bore.

5. A stamping machine of the character described which comprises, in combination: a frame having an upper portion and a lower portion; an elongated vertically reciprocable shearing member connected to said upper portion and a second shearing member disposed beneath said first mentioned shearing member and supported by said lower portion, said members having cooperating shearing edges adapted to cut chips out of a work sheet interposed therebetween, and said second shearing member having a vertical bore for reception of a part of said first mentioned shearing member fitting with cutting clearance in said bore when said reciprocable shearing member is reciprocated in a direction toward said second shearing member whereby said shearing edges cut a chip out of said work sheet and cause the chip to enter into said bore, said elongated reciprocable shearing member alternatively opens and closes said bore during its reciprocation; a pressing finger connected to said upper portion and extending toward said second shearing member for holding said work sheet in position thereabove, said finger having a bifurcated lower end surrounding said first mentioned shearing member when the latter is reciprocated in a direction toward said second shearing member and a plurality of channels leading toward said bifurcated end; a source of lubricating liquid connected with said finger for introducing lubricating liquid into said channels; tubular means connected with said lower portion and disposed beneath said second shearing member, said tubular means having an upper end connected with said second shearing member, a lower end, and defining a vertical passage communicating with said bore; an enclosure connected with the lower end of said tubular means in such manner that its interior communicates with said passage; and means for creating vacuum in said enclosure, in said passage and in said bore.

6. A stamping machine of the character described which comprises, in combination: a frame having an upper portion and a lower portion; an elongated vertically reciprocable shearing member connected to said upper portion and a second shearing member disposed beneath said first mentioned shearing member, said members having cooperating shearing edges adapted to cut chips out of a work sheet interposed therebetween, and said second shearing member having a vertical bore for reception of a part of said first mentioned shearing member fitting with cutting clearance in said bore when said reciprocable shearing member is reciprocated in a direction toward said second shearing member whereby said shearing edges cut a chip out of said work sheet and cause the chip to enter into said bore, said elongated reciprocable shearing member alternatively opens and closes said bore during its reciprocation; a pressing finger connected to said upper portion and extending toward said second shearing member for holding said work sheet in position thereabove, said finger having a bifurcated lower end surrounding said first mentioned shearing member when the latter is reciprocated in a direction toward said second shearing member and a plurality of channels leading toward said bifurcated end; a source of lubricating liquid connected with said finger for introducing lubricating liquid into said channels; tubular means connected with said second portion and disposed beneath said second shearing member, said tubular means having an upper end connected with said second shearing member, a lower end, and defining a vertical passage communicating with said bore; an enclosure connected with the lower end of said tubular means in such manner that its interior communicates with said passage and comprising door means; a receptacle insertable and removable through said door means and located in said enclosure beneath the lower end of said tubular means; and means for creating vacuum in said enclosure, in said passage and in said bore.

7. A nibbling machine comprising, in combination, a frame having an upper portion and a lower portion; an elongated vertically reciprocable shearing member connected to said upper portion and a second shearing member supported by said lower portion beneath said reciprocable shearing member, said shearing members having cooperating shearing edges adapted to cut chips out of a work sheet interposed therebetween, and said second shearing member having a vertical bore for reception of a part of said reciprocable shearing member fitting with cutting clearance in said bore when said reciprocable shearing member is reciprocated in direction toward said second shearing member whereby said shearing edges cut a chip out of said work sheet and cause the chip to enter said bore; means for feeding lubricating liquid toward the shearing edge of said second shearing member; and means operatively connected with said second shearing member for creating vacuum in said bore so that when said reciprocable shearing member is reciprocated in a direction away from said shearing member said last mentioned means draws air and lubricating liquid into said bore for cooling and lubricating said shearing members and for withdrawing the chips from said bore.

References Cited in the file of this patent

UNITED STATES PATENTS

| | | |
|---|---|---|
| 1,786,153 | Doyle | Dec. 23, 1930 |
| 1,940,178 | Mohr | Dec. 19, 1933 |
| 2,184,955 | Gerlach | Dec. 26, 1939 |
| 2,272,751 | Robinson | Feb. 10, 1942 |
| 2,340,553 | Obear et al. | Feb. 1, 1944 |
| 2,364,334 | Wold | Dec. 5, 1944 |
| 2,489,559 | Boyle | Nov. 29, 1949 |
| 2,707,028 | Burton | Apr. 26, 1955 |

FOREIGN PATENTS

| | | |
|---|---|---|
| 1,030,859 | France | Mar. 18, 1953 |